TRANSCENDENTAL FUNCTION GENERATOR
Filed Sept. 7, 1967 5 Sheets-Sheet 1
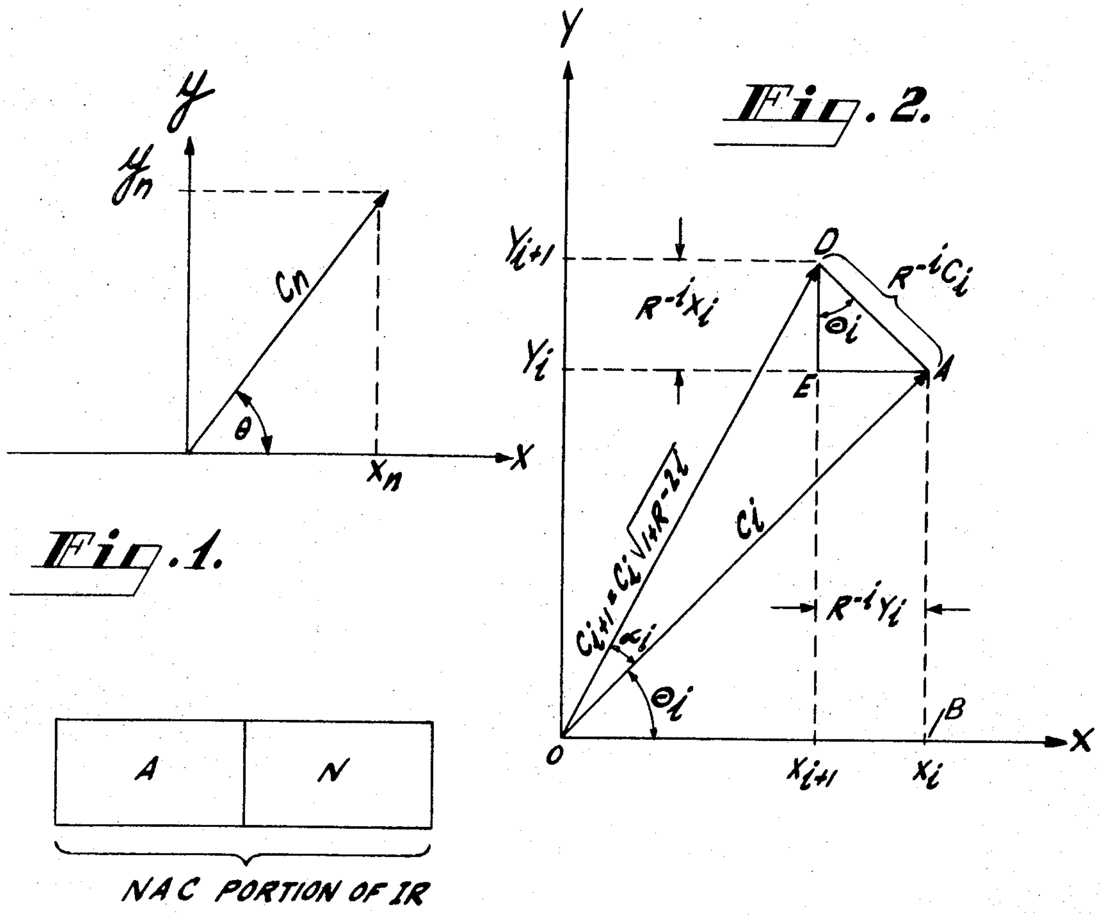
FIG. 1, FIG. 2
FIG. 5.
FIG. 4.
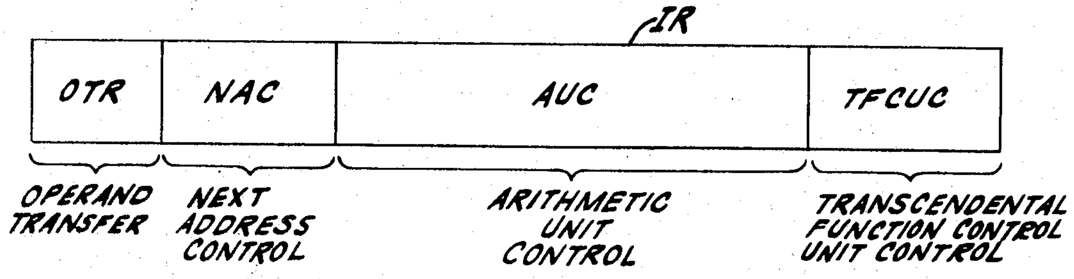
INVENTORS
HENRY S. MIILLER AND
ROBERT J. LINHARDT
BY Robert R Hubbard
ATTORNEY

INVENTORS
HENRY S. MILLER AND
ROBERT J. LINHARDT

BY Robert R. Hubbard
ATTORNEY

INVENTORS
HENRY S. MILLER AND
ROBERT J. LINHARDT
BY Robert R. Hubbard
ATTORNEY

INVENTORS
HENRY S. MILLER AND
ROBERT J. LINHARDT
BY Robert R. Hubbard
ATTORNEY

INVENTORS
HENRY S. MILLER AND
ROBERT J. LINHARDT
BY Robert R. Hubbard
ATTORNEY

United States Patent Office 3,562,714
Patented Feb. 9, 1971

3,562,714

TRANSCENDENTAL FUNCTION GENERATOR

Henry S. Müller, Yardley, Pa., and Robert J. Linhardt, Moorestown, N.J., assignors to RCA Corporation, a corporation of Delaware Filed Sept. 7, 1967, Ser. No. 666,183
Int. Cl. G06f 7/39
U.S. Cl. 340—172.5 5 Claims

ABSTRACT OF THE DISCLOSURE

A transcendental function generator apparatus for two-part evaluation of sine and cosine functions, as well as other functions, is described. The first of the two parts resembles a division-like iteration; while the second of the two parts resembles a multiplication-like iteration. The generator is implemented with a storage unit and a transcendental function control unit.

The invention herein described was made in the course of or under a contract or subcontract thereunder with the Department of the Air Force.

CROSS REFERENCE

A patent application, Ser. No. 603,635 entitled, Computer System Adapted to be Constructed of Large Integrated Circuit Arrays, filed Dec. 21, 1966 by Henry S. Miller, et al. now U.S. Pat. No. 3,462,742 and assigned to the present assignee describes a computer organization with which the transcendental function generator of the present invention may be implemented.

BACKGROUND REFERENCES

An article entitled, "Pseudo Division and Pseudo Multiplication Processes," by J. E. Meggitt, pages 210 through 226 in the IBM Journal, April 1962, describes digit-to-digit techniques for the evaluation of various functions.

BACKGROUND OF INVENTION

The present invention relates to transcendental function generator apparatus useful in computers and other equipment to generate various physical quantities including voltages, currents, displacements, and the like, representative of various nonalgebraic functions, such as trigonometric, logarithmic, hyperbolic and exponential functions. By way of example, transcendental function generators may be employed in solving various problems in navigation, in radar and in scientific applications.

According to known digit-by-digit techniques of numerical evaluation of transcendental functions, the computer control unit causes the arithmetic unit of the computer to perform a division-like operation followed by a multiplication-like operation. For some transcendental functions, notably the logarithmic function, only the division and multiplication operations are performed. However, for other transcendental functions, including the very important sine and cosine functions, further operations in addition to the division and multiplication operations are required. Thus, the aforementioned article by J. E. Meggitt describes the sine and cosine function generation as further requiring a squaring operation for each of two numbers, a sum of the squares operation and a square root operation. The square root operation itself is described to include, inter alia, another division-like operation. These further operations are time consuming and the square root operation can introduce error into the sine and cosine function generation.

Transcendental function generation according to the invention employs digit-by-digit techniques whereby the function generator can be constructed with computer apparatus having a slightly modified control unit and an allocation of memory storage for a few constants whereby the sine, cosine, hyperbolic sine and hyperbolic cosine functions require only the division and multiplication operations.

BRIEF SUMMARY OF INVENTION

According to the transcendental function generator apparatus of the invention, the sine and cosine functions of an argument are generated as a result of only a two-part evaluation of a division-like operation followed by a multiplication-like operation, whereby machine time and power consumption are conserved. The apparatus includes a storage unit, an arithmetic unit and a control unit. The storage unit stores, inter alia, the argument, a plurality of first constants representative of angular increments and a second constant representative of a scaling factor. The arithmetic unit includes register means and further means operative to perform adding, subtracting and shifting operations.

The control unit includes first and second transfer means, control means and sensing means. The first transfer means is responsive to a sine and cosine function command and to transfer the argument to the arithmetic unit. The control means subsequently causes the second transfer means to sequentially transfer the first constants to the arithmetic register means. The control means further causes the arithmetic unit to perform a division-like iteration in which the argument is the dividend while the divisor for each iterative cycle is a different one of the first constants, the quotient being generated digit-by-digit and on an iterative cycle-by-cycle basis.

The sensing means senses the completion of the last cycle of the division-like iteration and in response thereto conditions the second transfer means to transfer the second scaling factor constant to the arithmetic register means. The control means responds to the sensing means to cause the arithmetic unit to perform a multiplication-like iteration in which the second constant is the initial multiplicand, the previously generated quotient digits are the multiplier digits, the multiplicands for successive iterative cycles being up-dated by a shifted version of the previous cycle accumulated partial product. At the completion of the last iterative cycle, the multiplicand and accumulated partial product are the cosine and sine, respectively, of the argument.

According to one aspect of the invention, calculator apparatus is provided for generating $n$ significant output digits one-by-one on a cycle-by-cycle basis of an iterative calculation. The apparatus includes a control means for setting the significance $n$ at the start of an iterative calculation and for interrupting the calculation when $n$ significant output digits have been generated.

BRIEF DESCRIPTION OF THE DRAWINGS

FIG. 1 is a graphical display of a unit vector displaced from the O or X axis by an argument $\theta$;

FIG. 2 is a graphical display showing the $i^{th}$ rotational step of a vector $C_i$;

FIG. 4 is a block diagram of the instruction register (IR) showing its bit organizational pattern;

FIG. 5 is a block diagram of a portion of the IR further elaborating the organizational pattern of the IR;

GENERAL INTRODUCTION

Figure 3:
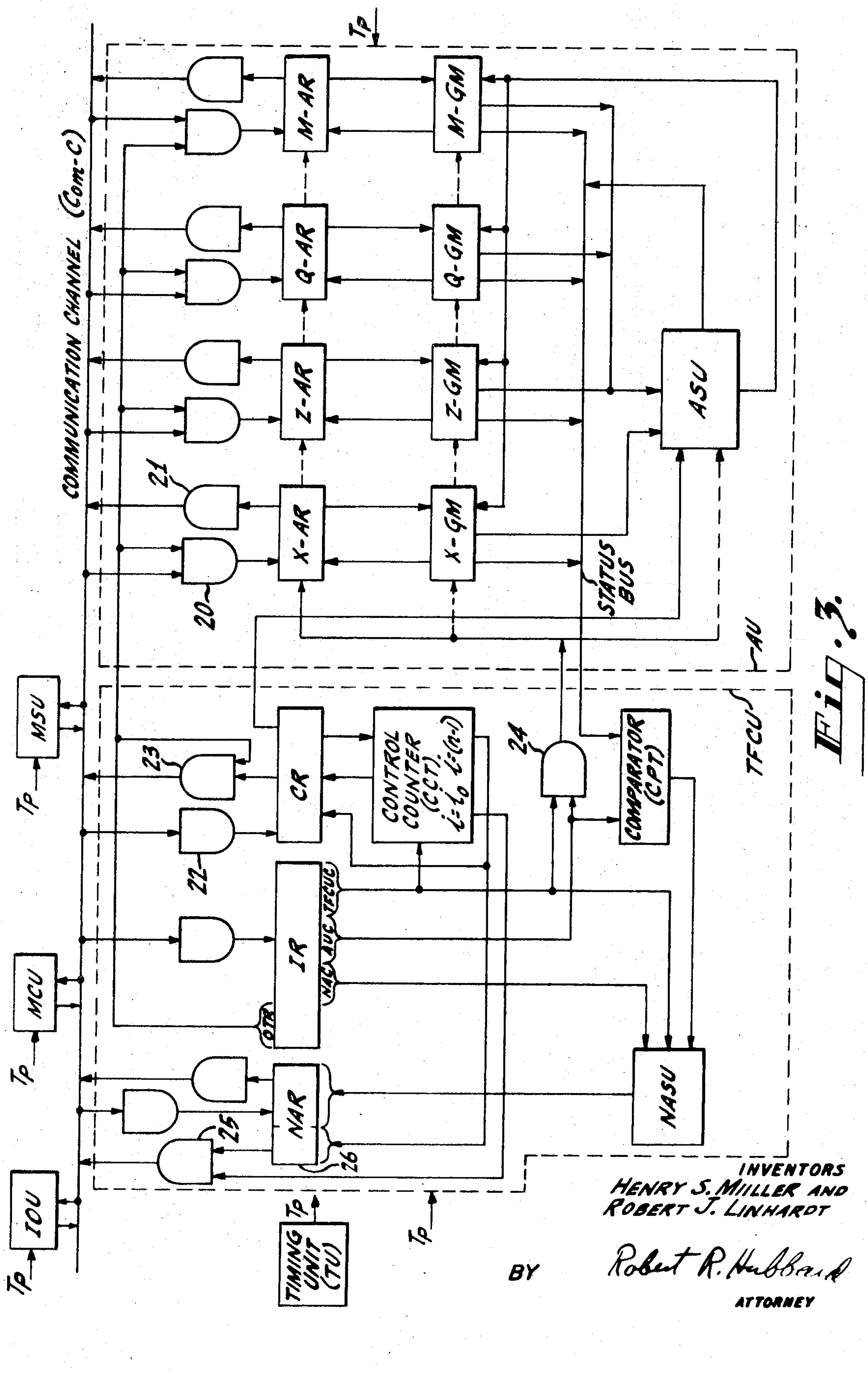
FIG. 3 is a block diagram of transcendental function generator apparatus according to the invention.

The invention is not limited in application to any particular radix or number system. However, by way of example and completeness of description, the transcendental function generator apparatus of the invention will be presented as a binary (radix of two) equipment. In binary systems, the electrical signals generally have either one of two distinct voltage levels, which levels are indicative of binary digits (bits). When a signal is at one of the two levels, it represents a bit of one value and when it is at the other level, it represents a bit of the other value. The one and other values may be assumed to represent the bits "1" and "0," respectively. To simplify the description which follows, these signals will sometimes be referred to as "1" and "0" signals and in some cases, merely as bits.

Transcendental function generator apparatus according to the invention employs digit-by-digit techniques resembling multiplication and division operations whereby stored program computer apparatus may be used to implement the generator. In a stored program computer various functions are performed by means of a set of instruction words. By combining these instruction words in various sequences (programs) the computer can be directed to carry out complex functions. These instruction words are stored in a memory storage unit which also stores operands (numbers) to be processed. A control unit, which generally includes an instruction register, a next address register, a control counter and various other gating circuits, executes the instructions by causing an arithmetic unit to perform the basic operations of add, substract, multiply and divide on selected operands.

Of interest in the present description are typical, known multiplication and division operations. Consider that the arithmetic unit includes at least three registers conveniently designated X, Z and Q, an add and substract device, and various gating and shifting circuits. A typical multiplication may use the X register as the multiplicand register; the Q register as the multiplier register; and the Z register as the partial product (and upon completion of the operation the product) register. The sequence of steps includes an iteration whereby the multiplicand X is added or not added to the partial product Z according to whether the least significant bit or position of the multiplier Q is a "1" or a "0," respectively. In either event, the contents of the Z register and the multiplier Q are right-shifted one position before the next cycle of the iteration begins. The iteration continues for a number of cycles equal to the number $m$ of bits in the multiplier Q.

For a typical division of fractional binary numbers, the X register becomes the divisor register; the Z register becomes the dividend (and during the operation the partial remainder and upon completion of the operation the remainder) register; and the Q register becomes the partial quotient (and upon completion of the operation the quotient) register. The sequence of steps for binary nonrestoring division includes, inter alia, an iteration whereby the divisor X is either added to or substracted from the partial remainder Z according to whether the partial remainder Z is negative or positive, respectively. In either event, the partial remainder Z and the partial quotient Q are left-shifted one position before the next cycle of the iteration begins. The iteration continues for a number of cycles equal to the number $m$ of places (e.g. bits in base 2 number system, digits in base 10 number system) in the divisor X.

Digit-by-digit evaluation of transcendental functions

A digit-by-digit method of numerical evaluation which is well-known may be generally demonstrated with the following example for the logarithm of a number Y.

Any number Y such the $1<Y<1000$ can be represented as a product of known factors to an accuracy of $k$ significant digits $$Y=\pi_{j=0}^{k}(1+10^{-j})^{(q_j)} \tag{1}$$

where the exponent $q_j$ is an integer (0, 1, 2 . . . 8, 9) which gives the number of times the factor $(1+10^{-j})$ is to be used. The symbol $\pi$ signifies the product of the bracketed factors which follow. For instance, the maximum number of integer times that Y is divisible by $(1+10^{-0})$ is $q_0$. The remainder of this division process becomes the new number $Y_1$. Then, $q_1$ is the maximum number of integer times that $Y_1$ is divisible by $(1+10^{-1})$ with a remainder of $Y_2$, and so on.

For a numerical example, consider the following evaluation, $$\begin{aligned} Y&=19.66\\ &=(1+10^0)^4.(1+10^{-1})^2.(1+10^{-2})^1\\ &\qquad (1+10^{-2})^5.(1+10^{-4})^4\\ &=(2)^4.(1.1)^2.(1.01)^1.(1.001)^5.(1.0001)^4 \end{aligned}$$

where $q_0=4$, $q_1=2$, $q_2=1$, $q_3=5$, $q_4=4$ and $k=4$. Taking the log of both sides of Equation 1, $$\log Y=\sum_{j=0}^{k} q_j \log (1+10^{-j}) \tag{2}$$

Applying Equation 2 to the preceding numerical example, $$\begin{aligned} \log 19.66&=4 \log (1+10^0)+2 \log (1+10^{-1})+\log (1+10^{-2})+5 \log (1+10^{-3})+4 \log (1+10^{-4})\\ &=4 \log (2)+2 \log (1.1)+\log (1.01)+5 \log (1.001)+4 \log (1.0001)\\ &=4 (.30103)+2 (.041393)+(.004321)+5 (.000434)+4 (.000044)\\ &=1.29357 \end{aligned}$$

From five-place log tables log (19.66)=1.29358. This example employs decimal numbers, i.e., Radix R=10, merely for the sake of convenience. Equation 1 can be made more general by substituting R for the number 10.

The calculation for log Y can be split into two parts as shown in Equations 1 and 2 and as illustrated by the example. In Equation 1 the digits $q_j$ are calculated in an operation that resembles division and in Equation 2 the logarithm is calculated from stored constants, $$\log (1+10^{-j}$$

in an operation that resembles multiplication. Note that the quotient digits $q_j$ are used as multiplier digits in the multiplication operation.

A modification of the digit-by-digit technique described above is adapted to sine and cosine function evaluation in accordance with the present invention. The sine and cosine of an angle or argument $\theta$ can be considered as the ordinate and abscissa, respectively, of a unit vector rotated from the zero axis through an angular displacement of $\theta$. Thus in FIG. 1, the unit vector $C_n$ is displaced from the zero or X-axis by an angle $\theta$ such that the ordinate $Y_n$ is the sine $\theta$ and the abscissa $X_n$ is the cosine $\theta$. In essence, the sine and cosine function evaluation is a two-part evaluation of a division-like operation followed by a multiplication-like operation. The first part (division) comprises the transformation of the argument $\theta$ into a sequence of factors (angular increments). The second part (multiplication) is to rotate a vector from the zero or X-axis through the sequence of angular increments (determined in the first part) so that the vector magntiude is unity when the rotation is terminated. The vector $C_n$ is considered as a unit vector in order to assure that the sine and cosine evaluation requires only the two-part evaluation of a division-like operation followed by a multiplication-like operation.

For the discussion which follows, Table 1 lists definitions of some of the variables employed.

TABLE 1.—DEFINITIONS OF SOME VARIABLES $m$ is the integer number of places (e.g., bits in binary number system) in a word.
R is the radix of the number system (e.g., R equals 2 in binary, 10 in decimal).
$\theta$ is the angle or argument expressed in radians in the sine and cosine function evaluation.
$n$ is an integer equal to the number of significant places in a word and $n \leq m$.
$i$ is a place value relating to a particular place in a word. These places are numbered increasing in integer value from the most significant place to the least significant place and $i_0 \leq i \leq (m-1)$.
$i_0$ is an initial value for $i$.
$q_i$ is an integer other than 0 such that $-R < q_i < +R$.
$\alpha_{i_0}$ is the maximum value of $\theta$ divided by R.
$\alpha_i$ is equal to $(\tan^{-1}R^{-i}$
$K_i$ is equal to $2^i\alpha_i$.
$C_0(n^{-1})$ is a scaling factor whose value is dependent upon $n$, the number of significant places in a word.

The vector rotation can be performed in a number of fixed predetermined step quotations whereby $$\theta = \sum_{i=i_0}^{n-1} q_i\alpha_i \qquad (3)$$

where $\theta$, $i$, $i_0$, $n$, and $q$ are defined in Table 1. In addition, the initial value $\alpha_{i_0}$ is the maximum value of $\theta$ divided by R or $\theta_{max}/R$; and subsequent values of $\alpha_i$ are defined herein below.

Referring now to FIG. 2 for the $i^{th}$ rotational step, the vector $C_i$ has the coordinates $X_i$, $Y_i$. Assume that the next or $(i+1)^{th}$ rotational step requires the rotation of the vector $C_i$ counter-clockwise by the angular increment $\alpha_i$ to obtain the vector $C_{i+1}$ which has the coordinates $X_{i+1}$, $Y_{i+1}$. The angular increment $\alpha_i$ chosen for any step rotation is the angle whose tangent is $R^{-i}$. Thus, Equation 3 may be rewritten as follows:

$$\theta = \sum_{i=i_0}^{n-1} q_i[\tan^{-1}R^{-i}] \qquad (4)$$

According to Equation 4, the angle $\theta$ is transformed into a sequence of angular increments whereby the transformation resembles division. In this transformation or division-like operation, the angle or argument $\theta$ is the dividend and the angular increments or constants $$(\alpha_i = \tan^{-1}R^{-i})$$

are successive divisors to generate a quotient on a digit-by-digit basis as the value of $i$ changes from $i_0$ to $(n-1)$. Thus, there is a different divisor (angular increment) for each cycle of the iteration from $i_0$ to $(n-1)$. For the binary examples, described in detail hereinafter, the quotient is generated as a series of "1's" and "0's." For binary (R=2) non-restoring division, if the angular constant is added to the partial remainder (angle $\theta$ initially), the quotient digit is "0." On the other hand, if the angular constant is substracted from the partial remainder, the quotient digit is "1." As in the case for normal non-restoring division, a negative partial remainder calls for the addition of the divisor (angular constant) and a positive partial remainder calls for substraction. This first part operation can be described by the following recursive equation $$Z_{i+1} = 2(Z_i \pm 2^i \tan^{-1}2^{-i}),\ i=0,\ 1\ .\ .\ .\ n \qquad (5)$$

where $Z_i$ represents the partial remainder and the factor $2^i$ represents leftward displacements of the angular constants $(\alpha_i = \tan^{-1}2^{-i})$.

It can be shown that for $$-\frac{\pi}{2} \leq \theta \leq +\frac{\pi}{2}$$

seven angular increments are needed for an accuracy of better than one degree. The seven angular increments are listed in Table 2 for values of $i_0=0$, $n=7$, and radix R=2.

TABLE 2

| $i$ | $\tan^{-1}2^{-i}$ | $\alpha_i$, degrees |
|---|---|---|
| 0 | $\tan^{-1}2^{0}$ | 45.0 |
| 1 | $\tan^{-1}2^{-1}$ | 26.56 |
| 2 | $\tan^{-1}2^{-2}$ | 14.03 |
| 3 | $\tan^{-1}2^{-3}$ | 7.12 |
| 4 | $\tan^{-1}2^{-4}$ | 3.58 |
| 5 | $\tan^{-1}2^{-5}$ | 1.79 |
| 6 | $\tan^{-1}2^{-6}$ | 0.90 |

Each of the quotient digits generated in the division-like operation represents a positive or negative unit value (direction of rotation) depending on its binary significance. Thus, a quotient digit of "1" can be interpreted as a positive unit value of counter-clockwise rotation, and a "0" as a negative unit value of clockwise rotation. In effect, the division type operation starts with a vector displaced from the positive abscissa axis by the angle $\theta$ and rotates the vector through a series of ever decreasing angular increments. The sum of all these rotational steps, if taken in the same direction, must at least equal the maximum value of the angle $\theta$. Similarly, successive rotational steps should differ from each other by a factor either equal to or somewhat less than two.

The range of $\theta$ can be extended such that $-\pi \leq \theta \leq +\pi$ by adding or subtracting (depending on the sign of $\theta$) 90 degrees $(\pi/2)$ to or from $\theta$ in an initial step, often called argument reduction, to bring $\theta$ to the range $$-\frac{\pi}{2} \leq \theta \leq +\frac{\pi}{2}$$

It should be noted that a 90 degree rotation of a vector is identical to interchanging the magnitude of the ordinate and abscissa of the vector (interchanging the magnitudes of the contents of the X and Z registers in the binary apparatus example which follows). The signs of the two quantities are determined by the quadrant location of the vector and the direction of rotation.

The quotient digits of the first part division operation represent the directions of the incremental rotations of the vector $C_i$ in FIG. 2. In the second part of the sine and cosine evaluation, these quotient digits are utilized as multiplier digits in a multiplication-like operation which rotates the vector $C_i$ from the X axis through the angle $\theta$ to its unity value.

Referring again to FIG. 2, the side AD of triangle OAD is equal to $R^{-i}C_i$. From plane geometry it can be shown that right triangle DEA is similar to triangle OBA. A property of similar triangle is that their respective sides are proportional. Therefore, $EA = R^{-i}Y_i$ and $ED = R^{-i}X_i$ such that the following relationships are obtained:

$$Y_{i+1} = Y_i + R^{-i}X_i \qquad (6)$$

$$X_{i+1} = X_i - R^{-i}Y_i \qquad (7)$$

A clockwise rotation of $C_i$ by $\alpha_i$ would only change the signs of the modifying terms, so the general equations are:

$$Y_{i+1} = Y_i \pm R^{-i}X_i \qquad (8)$$

$$X_{i+1} = X_i \mp R^{-i}Y_i \qquad (9)$$

Although the recursion Equations 8 and 9 are derived with an increasing index value $i$, they could have been derived with a decreasing index value, namely, $$Y_{i-1}=Y_i \pm R^{-i}X_i \quad (10)$$

$$X_{i-1}=X_i \mp R^{-i}Y_i \quad (11)$$

It is convenient to let $$Z_i=R^iY_i \quad (12)$$

Letting R=2 (binary example) and substituting Equation 12 into Equations 10 and 11

$$Z_{i-1}=2^{-i}(Z_i \pm X_i) \quad (13)$$

$$X_{i-1}=X_i \mp 2^{-2i}Z_i \quad (14)$$

According to Equations 13 and 14, the vector rotation part of the sine and cosine function evaluation resembles a multiplication-like operation. The multiplicands for the multiplication operation are the successive abscissa values $X_i$ (from Equation 14). The accumulator for the multiplication contains the ordinate values $Z_i$ (from Equation 13) such that successive $X_i$ values are added or subtracted thereto in accordance with the binary significance of the successive multiplier digits (the previously generated quotient digits).

The recursive ordering in the first part division was from most significant to least significant, $i=i_0$ to $i=(n-1)$. For the second part multiplication, the recursive Equations 13 and 14 are utilized with ordering going from least to most significant, $i=(n-1)$ to $i=i_0$, in order to conform to classical multiplication.

The substitution of Z for Y in Equations 13 and 14 requires no transformation in initial conditions or final value since the initial value of Y is zero, i.e., $$Z_{n-1}=2^{n-1}Y_{n-1}=0$$

and the final value of Z is $Z_0$ (i.e., $Z_0=2^0Y_0=Y_0$). The contents of the accumulator are represented by $Z_i$ to which the multiplicands $X_i$ are either added or subtracted as signified by "1" or "0" multiplier bits, respectively. A subsequent right shift of the accumulator implements the division by two (multiplication by $2^{-1}$). Updating the multiplicand by the factor $(2^{-2i}Z_i)$ completes the cycle. This factor $(2^{-2i}Z_i)$ is developed in an auxiliary storage location at the start of each cycle of the iteration.

The initial value $X_0$ of the abscissa, however, is a scaling factor such that the final value of the rotated vector is unity. Referring again to FIG. 2, it is seen that the vector $C_i$ increases in magnitude after each rotation by a factor $(1+R^{-2i})^{1/2}$. Consequently, to obtain a unit vector after $n$ rotations, the initial value $C_0(n-1)$ of the vector must be equal to the scaling factor.

$$C_0(n-1)=\frac{1}{\prod_{i=0}^{n-1}\sqrt{1+R^{-2i}}} \quad (15)$$

This scaling factor is the initial value of X (abscissa); while the initial value of Y (ordinate) is 0. The final value of X or $X_n$ is the cosine of the angle $\theta$; while the final value of Y or $Y_n$ is the sine of the angle $\theta$.

Transcendental function generator apparatus

For convenience of description, the transcendental function generator is exemplified as embodied in a simplified binary (R=2) processing system. Further, the operation of the system is limited to a device of several typical instruction words which are well-suited for the illustrated embodiment. However, it is understood that the invention is applicable to other systems operating on different radices, for example, R=10 (decimal), and to more complex systems.

The following abbreviations are used in describing the arrangement and operation of the system in FIG. 3:

ASU: Arithmetic and Shift Logic Unit
AU: Arithmetic Unit
CCT: Control Counter
COM–C: Communication Channel
CPT: Comparator
CR: Count Register
IOU: Input-Output Section
IR: Instruction Register
M–AR: M-Arithmetic Register
MCU: Master Control Unit
M–GM: M-Gating Matrix
MSU: Master Storage Unit
NAR: Next Address Register
NASU: Next Address Selection Unit
Q–AR: Q-Arithmetic Register
Q–GM: Q-Gating Matrix
TFCU: Transcendental Function Control Unit
T*p*: Timing Bus
TU: Timing Unit
X–AR: X-Arithmetic Register
X–GM: X-Gating Matrix
Z–AR: Z-Arithmetic Register
Z–GM: Z-Gating Matrix Reference is now made to FIG. 3 where there is shown a stored program computer apparatus including a communication channel (COM–C) having a number of units coupled thereto. These units are identified as an input-output unit (IOU), a master control unit (MCU), a memory storage unit (MSU), a transcendental function control unit (TFCU), and an arithmetic unit (AU).

The communication channel (COM–C) includes a number of conductors some of which are adapted to carry data signals between the various units and others of which are adapted to carry control signals between the various units. Similarly, the coupling leads between each of the units and the communication channel include a number of conductors for carrying either data or control signals in the directions indicated by the arrows.

Each of the units described above has a timing pulse bus T*p* from a timing unit (TU). The timing unit TU is the clock or timing system which controls the operation of the entire computer apparatus in a synchronous manner. By way of example and completeness of description, the timing unit TU may include means for operating the transcendental function generator on a typical timing cycle of optional operand fetch, execute (data process or next instruction word branching), and next instruction word fetch. For such a timing cycle, the timing unit TU provides synchronous timing or clock signals to the various gates, registers, counters and other operational elements throughout the cycle. It should be noted, however, that the transcendental function generator may also be embodied in an asynchronous type of system.

In accordance with known principles, various portions of the memory storage unit MSU are allocated to the storage of instruction words, operands, data and the like. The MSU may be one large memory, for example a random access magnetic core memory, or may also include separate other memories, such as wired or semipermanent type memories which can have various locations in the computer system. In any event, a desired program is executed under the control of the master control unit MCU. When the program calls for arithmetic operations, the MCU and TFCU cooperate to control the AU to perform the called for arithmetic operations. In particular, the stored instruction words are addressed from the MSU in the sequence called for by the program to operate the AU in the required manner. In effect, the TFCU is a functional part of the MCU but is shown as separate therefrom for convenience in illustrating the modifications needed for transcendental function generation. It should be noted, however, that the TFCU could just as well be a local control unit in accordance with the description in the aforementioned copending application of H. S. Miiller, R. J. Linhardt, and R. D. Sidnam.

According to the invention, a portion of the memory storage unit MSU is allocated to the storage of various numerical constants such as the angular increments or constants $\alpha_i$, listed in Table 2. In addition, the initial value of $X_i$ (the scaling factor $C_0(n-1)$ of Equation 15) is stored in the MSU. Each of the constants $\alpha_i$ and $C_0(n-1)$ is given a different address location so that each constant may be transferred to the AU in a proper sequence. Since the factor $R^i$ in recursive Equation 12 is a constant for each value of $i$, the angular increments may be stored in the form of $2^i\alpha_i$ ($K_i$ is defined as being equal to $2^i\alpha_i$) in order to avoid time consuming left-shifting of the constants $\alpha_i$ when they are transferred to the AU. Moreover, storing the constants in this manner leads to more precise results since precision would be lost during a left-shift operation through the introduction of $2^i$ zeros on the least significant ends of the AU register which receives the stored constants. In addition, the memory storage unit MSU is adapted to store the operands which are representative of input information inserted into the computer system by way of the input output unit IOU. For example, an argument or angle operand may be inserted into the system by the IOU and stored by the MSU until called for by the control portion of the system.

The arithmetic unit (AU) is shown to include four registers designated X–AR, Z–AR, Q–AR and M–AR. Each of these registers includes means such as flip-flops for the temporary or interim storage of a large number of information digits indicative of operands and results. A number of information digits can simultaneously be transferred between any one of the registers and the communication channel (COM–C) by means of input-output gates. For example, the X–AR register has an input gate means 20 and an output gate means 21, each of which includes enough separate gates to gate all the digits to or from the X–AR.

The arithmetic unit includes an arithmetic and shift logic unit (ASU) for adding and/or subtracting the contents of the various registers, and shifting the result. A gating matrix is associated with each of the registers for gating the contents of an associated register to the ASU or gating the result of the ASU to the associated register. To this end, the gating matrices X–GM, Z–GM, Q–GM, and M–GM are associated with the registers X–AR, Z–AR, Q–AR and M–AR, respectively. In addition, each of the gating matrices has an additional output for continuously providing status signals from the associated registers to a status bus as indicated in FIG. 3. In a similar manner the ASU includes means for providing status signals to the status bus as illustrated. The status signals, for example, can be used to indicate the sign of the number in the X–AR as well as whether it falls within the number range of the system. Similar to the COM–C channel, the status bus includes a number of individual lines for receiving the status signals of the various registers and the ASU. By way of example, one signal on the status bus would be a "1" if the contents of the Z–AR register are less than zero (negative) and another signal would be a "1" if the least significant bit of the Q–AR register is a "1."

The transcendental function control unit (TFCU) includes a number of registers coupled to the communication channel (COM–C). These registers are identified as a next address register (NAR), an instruction register (IR) and a count register (CR). Like the previously described AU registers, the NAR, IR and CR registers include means such as flip-flops for the storage of information digits or bits. Also, each of these registers is similarly provided with input-output gates for the transfer of data to and from the communication channel (COM–C). For example, the CR register has an input gating means 22 and an output gating means 23. Gating means 22 includes enough separate gates to gate all of the bits to the CR and gating means 23 includes enough gates to gate the bits from at least part of the CR to the COM–C.

The IR register is adapted to receive instruction words via its input gating means from the communication channel (COM–C). The IR register is shown to include four portions, best seen in FIG. 4. These four portions are identified as the operand transfer (OTR) portion, the next address (NAC) portion, the arithmetic unit control (AUC) portion and the transcendental function control unit control (TFCUC) portion. Each of these portions includes a number of digits or bits (which number may be different for each of the portions) for providing signals to the associated functional designations.

The TFCUC portion of the IR controls counter (CCT), a next address selection unit (NASU), and also provides an input to a gate 24. The AUC portion provides the control signals needed to operate the arithmetic unit. The control signal paths to the various AU registers and gating matrices and to the ASU are illustrated by the dashed line connectors. These signals are gated via gate 24 when it is enabled by the TFCUC control portion. Also the AUC portion is fed to a comparator CPT means for comparison with a bit pattern on the status bus. Thus, the CPT means has one input from the AUC portion of the IR and another input from the status bus. The terms, input and output, are here used in a collective sense to include a line for each bit. The CPT output is fed to the next address selection unit (NASU).

The NAC portion of the IR provides the bit pattern which, after manipulation in the NASU, becomes the address of the next instruction word for the IR. By way of example and completeness of description, the NASU can be described as operating in two alternative modes. In the first mode, the N portion (see FIG. 5) of the NAC bit pattern is gated to the NAR. This first operation mode corresponds to the condition wherein the AUC portion of the IR is controlling the arithmetic unit, i.e., gate 24 is enabled by TFCUC. This first operation mode can be called a data processing operation when referring to the timing cycle of TU. In the second mode NASU selects either the A portion or N portion of the NAC bit pattern as conditioned by the output signal of the CPT. This second operation mode corresponds to the condition where gate 24 is not enabled by TFCUC and can be called the next instruction word branching when referring to the timing cycle of the TU.

The OTR portion of the IR provides an optional operand fetch bit pattern, i.e., the OTR pattern may or may not call for the transfer of operands from the MSU to the AU. To this end the OTR portion is illustrated as connected by a bus to the output gate 23 of the CR register as well as to the input gates for the AU registers, such at gate 20. Thus, the OTR bit pattern selectively enables these gates for operand transfer from the MSU to the AU registers during the operand fetch portion of the timing cycle of the TU.

The control counter CCT is capable of incrementing and decrementing operations. The signals which control or command the CCT to increment or decrement are supplied from the TFCUC portion of the IR. Part of the CCT contains a counting means whereby the count value $i$ is incremented or decremented between the limits of $i_0$ and $(n-1)$ for transcendental function generation. The CCT also contains means for recognizing particular count values, namely, $i_0$ and $(n-1)$ and has output lines so labeled in FIG. 3 for sensing these values. The present counter state of the CCT is continuously monitored and stored by the count register CR. That is, as the count changes in the CCT, the CR changes state accordingly.

Figures 6, 9:
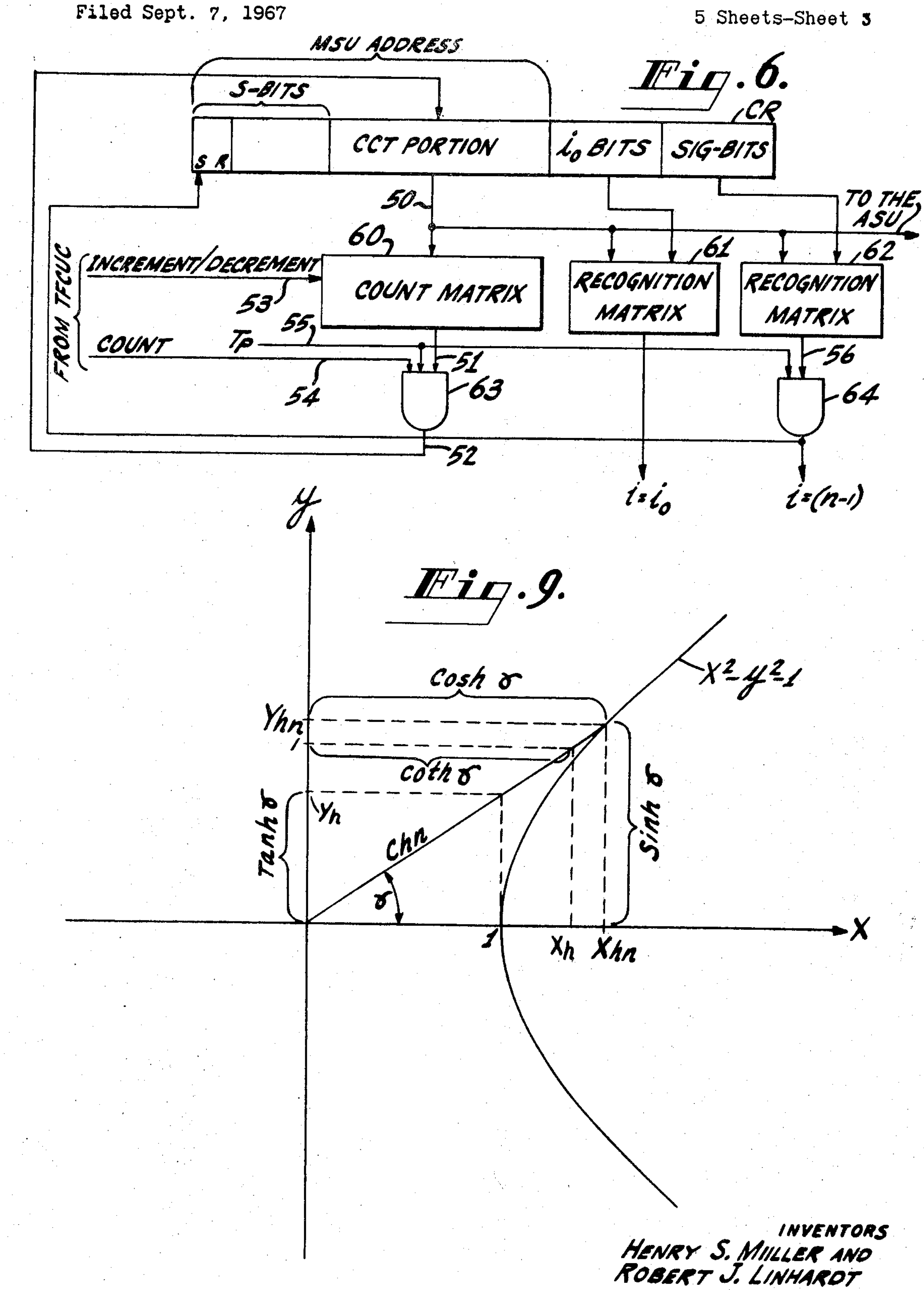
FIG. 6 is a block diagram of the count register (CR) showing its bit organizational pattern.
FIG. 9 is a graphical representation of hyperbolic functions.

The control counter CCT and the count register CR are illustrated in some detail in FIG. 6. The CR register is shown as including a significance (Sig-bits) portion, an $i_0$ bits portion, a CCT portion and a sector (S-bit) portion. The Sig-bits portion stores a digit or bit pattern signifying the significance $n$. For the illustrated example of $i_0=0$, the stored bit pattern is the value $(n-1)$ for $n$ bit significance. The $i_0$-bits portion stores a bit pattern signifying the initial value $i_0$. The CCT portion stores a digit pattern indicative of the present state or count value of the counter and together with the S-bits portion provides a memory address for the stored constants. The S-bit portion contains a bit pattern indicative of the memory sector location of the stored constant string for the transcendental function which is being evaluated. That is, different bit patterns are associated with the various functions of sine and cosine, hyperbolic sine and hyperbolic cosine, and so on, and are located in different sectors of MSU.

At the outset of a transcendental function generation, the CR register is initialized via the COM–C channel under the control of the master control unit MCU. For the case of sine and cosine evaluation, the S-bit pattern selects the $K_i$ and $C_0(n-1)$ constants for transfer to the arithmetic unit AU. The $i_0$-bit pattern serves to establish a reference value for the subsequent recognition of the $i_0$ count value by the CCT. This CCT output lead is labeled $i=i_0$ as shown in both FIGS. 3 and 6. The value of $i_0$ varies with the different transcendental functions (for example, $i_0$="0" for a trigonometric function evaluation and $i_0$="1" for a hyperbolic function evaluation). The Sig-bit pattern establishes a reference value for the subsequent recognition of the $(n-1)$ count value by the CCT counter. This CCT output lead is labeled $(n-1)$ as shown in FIGS. 3 and 6.

One of the sector bits illustrated at the left-hand side of the CR register is utilized to indicate whether the function evaluation is in the division operation or the multiplication operation. This indication is necessary so that the proper constants $K_i$ are selected for the division and the constant $C_0(n-1)$ is selected for the initial condition in the multiplication. Thus, for example, if the biary significance of this left-most S-bit is "0," the constants $K_i$ are addressed. On the other hand, if the left-most bit is a "1," the constant $C_0(n-1)$ is addressed for the $(n-1)$ count value originally established when the CR register was initialized. The binary significance of this sector bit is controlled by the $i=(n-1)$ output of the recognition matrix 62. This output is sensed by means of the connecting bus between the $i=(n-1)$ output and the left-most bit of the S-bit portion of the CR. Thus in the first part of the sine and cosine evaluation, the left-most bit of the S-bit portion of the CR is a "0." When the CCT count becomes $i=(n-1)$, the left-most bit changes to a "1" in response to the sensed signals at the $i=(n-1)$ output. With the left-most bit being a "1," the constant $C_0(n-1)$ is addressed for the initial condition of the second part.

As shown in FIG. 6, the counter CCT includes a count matrix 60 and a pair of recognition matrices 61 and 62. The count matrix 60 may be any combinatorial network, the output 51 of which is either one more (incrementing) or one less (decrementing) than the input 50 from the CCT portion of the CR. The recognition matrices 61 and 62 may be comparators, for example, for comparing the present state or count value of the counter (from the CCT portion of the CR register) with the $i_0$ value and the $(n-1)$ value, respectively, also contained in the CR register. To this end, the recognition matrix 61 is operable to provide a "1" signal output when the count value is $i_0$ and the recognition matrix 62 is operable to provide a "1" signal output (indicating signal) when the count value has reached its full value of $(n-1)$. That is, a total of $n$ iterative cycles has been completed. The recognition matrix 62 has an output 56 which is coupled to a gating means 64, which may be of the coincidence type. The gating means 64 has another input 65 to which is applied a timing pulse $Tp$ during the data process interval of the timing cycle. Gating means 64 has an output designated $i=(n-1)$ in FIG. 6. As explained previously, the $i=(n-1)$ output is coupled to the left-most bit of the S-bits portion of the CR in order to control the selection of the constants $K_i$ and $C_0(n-1)$ during the function evaluation.

The output 51 of the count matrix 60 is coupled to a logic gating means 63 which may also be of the coincidence type. The gating means 63 includes a sufficient number of gates to gate the full count value of the count matrix 60. The TFCUC bit pattern or field is applied as a control input 53 to the count matrix 60 as well as to a control input 54 to the logic gate 63. The combined TFCUC bit patterns on control inputs 53 and 54 serve to increment or to decrement the count as stored in the CCT portion of the CR in accordance with the operation being performed. The timing pulse $Tp$ input 55 is also applied to the logic gate 63 during the data process portion of the timing cycle to gate the incremented value of the count matrix to the CCT portion of the CR as signified by the output 52 of the gating means 63 being connected thereto.

A feature of the invention is the inclusion of a Sig-bit register means illustrated, by way of example, as a portion of the CR register. This portion of the CR register holds a bit pattern which signifies the number $n$ of significant digits, and for the present example has a value $(n-1)$. This stored value $(n-1)$ reacts with the recognition matrix 62 of the CCT in a manner permitting the bit pattern to be varied with the initializing of the CR whereby the precision or significance in a function evaluation is permitted to be varied. The ability to selectively reduce the significance is important in conserving machine time and power consumption. It should be noted at this point that for each different significance or precision of calculation, a different constant $C_0(n-1)$ (Equation 15) is required.

A flag circuit means for indicating the end of function evaluation includes a logic gate 25 and a flip-flop 26 which is illustrated as the left-most bit of the NAR register. The logic gate 25 is, for example, a coincidence type such as an AND gate whereby its output is a "1" signal only if both of its inputs are "1" signals. One of the inputs to the logic gate 25 is the $i=i_0$ output of the CCT. This output is a "1" signal only at the beginning and end of a two-part transcendental function evaluation. The other input to the gate 25 is from the left-most bit 26 of the NAR register. The bit 26 may be a set-reset flip-flop, as mentioned previously. At the start of the calculation, the NAR register including bit 26 is reset under control of the MSU. Thus, the bit 26 provides a "0" signal to the logic gate 25. When the CCT attains a count of $i=(n-1)$, the $i=(n-1)$ count signal is sensed and the bit 26 responds thereto to become set thereby providing a "1" signal to the gate 25. Thus, when the CCT subsequently decrements to $i=i_0$ both inputs to the coincidence gate 25 are "1" signals whereby its output is a "1" signal signifying the end of the transcendental function evaluation. The MCU may then respond to this end of calculation signal to control the next event in the program.

Figure 7:
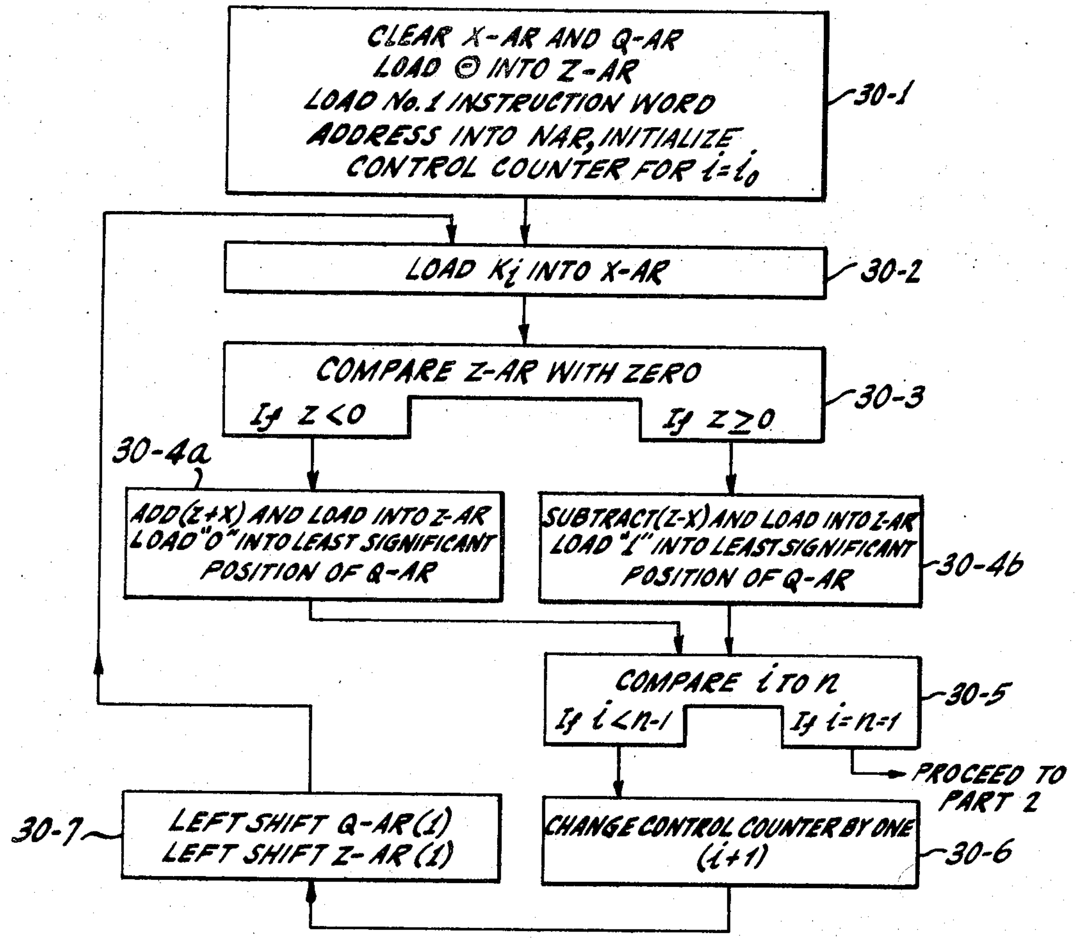
FIG. 7 is a flow chart diagram for the division-like iteration.
Figure 8:
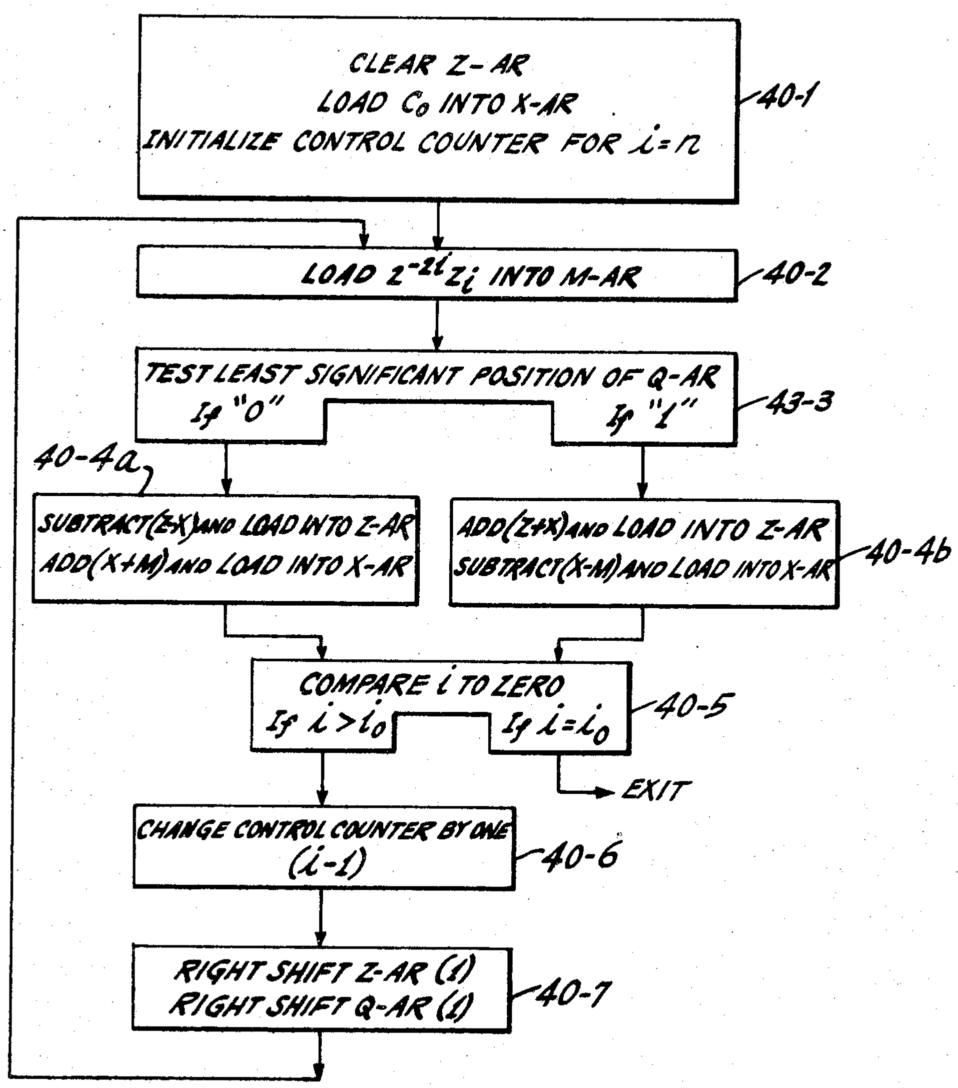
FIG. 8 is a flow chart diagram for the multiplication-like iteration.

The operational flow charts illustrated in FIGS. 7 and 8 for the sine and cosine function generation give a detailed insight into the operation of the transcendental function generator apparatus. Referring first to FIG. 7, which is descriptive of the first part division operation, the block 30–1 describes the initial conditions which are effected under the control of the MCU. As there shown, the X–AR and Q–AR registers are cleared (by commands from the MCU via the COM–C and the argument $\theta$ is transferred from the MSU to the Z–AR register by the MCU. The MCU also initializes the CR register including its CCT, $i_0$, $(n-1)$, and S fields. In addition, the MCU loads the NAR register with the address of the first instruction word (No. 1). The NAR responds to address the MSU and effects the loading of the No. 1 instruction word into the IR during the next instruction word fetch portion of the TU timing cycle. The OTR portion of the No. 1 instruction word enables gates 23 and 20 while the TFCUC portion permits the CR to address the MSU and thereby load the constant $K_i$ (for $i=i_0$) into the X–AR register as indicated by the block 30–2 in FIG. 7. This transfer of $K_i$ is accomplished during the optional operand fetch portion of the TU timing cycle.

In addition to causing the transfer of the constant $K_i$ from MSU to X–AR and during the execute portion of the TU timing cycle, the No. 1 instruction word effects a determination of the algebraic sign of the Z–AR register as described in the block 30–3 in FIG. 7. To effect the sign determination the No. 1 instruction word contains a bit pattern within its AUC portion which causes the output of the CPT means to respond if the Z–AR register is negative as indicated by a 1 on a particular status line. As a matter of convenience, the contents of the Z–AR register as well as the other arithmetic registers are referred to simply as the Z number, X number, Q number or M number. Depending upon the result of this comparison, either the block 30–4*a* or the block 30–4*b* is descriptive of the operation.

If the Z number is less than zero (negative), the NASU responds to the output of the comparator means CPT to gate the A field of the NAC portion of the IR to the next address register NAR. The NAR register addresses the MSU for the next or No. 2*a* instruction word which is transferred to the IR under control of the MSU. The IR then causes the arithmetic unit to add the Z and X numbers and to load the result into the Z–AR register as described in the block 30–4*a*. The next instruction word No. 3*a* causes a "0" to be loaded into the least significant position of the Q–AR register.

On the other hand if the Z number in the block 30–3 of FIG. 7 is equal to or greater than zero (positive) the instruction word No. 2*b* causes the arithmetic unit to subtract the X number from the Z number and to load the result into the Z–AR register as described in the block 30–4*b*. The next instruction word No. 3*b* then causes a "1" to be loaded into the least significant position of the Z–AR register. Instruction word No. 2*b* was selected because the NASU gated the N field of the NAC portion of the IR to the NAR in absence of a response from the CPT means during instruction No. 1.

Irrespective of whether the block 30–4*a* or 30–4*b* is descriptive of the operation, both the instruction words Nos. 3*a* and 3*b* provide for the comparison of the incremented value $i$ in the counter to $(n-1)$, as described in block 30–5. If $i$ is less than $(n-1)$, the next instruction work word No. 4 increments the control counter CCT by 1, as described in block 30–6 and causes the Q–AR register and Z–AR register to each be left-shifted by one position as described in block 30–7 to thus complete one cycle of the iteration. The next instruction word to be selected by the NASU and NAR is then the No. 1 instruction word. The iterative cycles continue until $i$ is equal to $(n-1)$ (e.g., $(n-1)$ equals 15 for 16-bit precision) as shown in the block 30–5. When $i$ does equal $(n-1)$, the output of the CCT causes the right-most bit of the CR register to change to a binary "1" whereby only the constant $C_0$ will be selected for the multiplication part of the sine and cosine evaluation. This CCT output also causes the flip-flop bit 26 in the NAR register to become set so that its output changes from a "0" to a "1." This change in the output bit pattern of the NAR register interrupts the division-like iteration by causing a No. 5 instruction word to be loaded in the IR register.

Referring now to FIG. 8, the No. 5 instruction word causes the Z–AR register to be cleared and the constant $C_0$ to be loaded into the X–AR register, as described in the block 40–1. Since the CCT counter is already at a value of $i=(n-1)$, no specific initializing instruction is necessary. When the X–AR register has been loaded, the NASU is enabled by the TFCUC portion to place the N-field of the NAC portion of the IR in the next address register NAR. The NAR register addresses the MSU for the next or No. 6 instruction word which is transferred to the IR. The No. 6 instruction word causes the ASU to shift the Z number $Z_i$ by the factor $2^{-2i}$ to load the result into the M–AR register. The $2^{-2i}$ factor is derived from the output of the count register CR, as indicated by the connecting bus line (FIG. 3) between the CR and ASU. The next or No. 7 instruction word tests or compares the least significant position of the Q–AR register to determine its binary significance, as described in the block 40–3. Depending upon the result of this test or comparison, either the block 40–4*a* of the block 40–4*b* is descriptive of the operation.

If the significant bit of the Q number is a "0," an instruction work No. 8 is loaded into the IR register. This is accomplished when the output of CPT fails to respond because a 0 is on the particular status line keyed by the AUC field and which is indicative of the value of the least significant bit of the Q number. In this case, NASU gates the N-field of the NAC portion of the IR to the NAR register. Instruction word No. 8*a* when in the IR then causes the arithmetic unit to subtract the X number from the Z number and to load the result into the Z–AR register, as described in the block 40–4*a*. The next instruction work No. 9*a* causes the arithmetic unit to add the X and M numbers and to load the result into the X–AR register.

On the other hand, if the least significant bit of the Q number is a "1," the next instruction word No. 8*b* causes the arithmetic unit to add the Z and X numbers and to load the result into the Z–AR register, as described in the block 40–4*b*. The next instruction word No. 9*b* then causes the M number to be subtracted from the X number and the result to be loaded into the X–AR register.

Regardless of whether block 40–4*a* or block 40–4*b* is descriptive of the operation, the next or No. 10 instruction word compares the value $i$ with $i_0$ (block 40–5). If $i>i_0$, the next instruction word No. 11 decrements the CCT counter by one (block 40–6), and causes the Q–AR register and the Z–AR register to each be right-shifted by one position as shown by block 40–7, thus completing one cycle of the iteration. The iterative cycles continue $i=i_0$ as shown in the block 40–5. When $i=i_0$ the $i=i_0$ output of the CCT changes from a "0" to a "1" thereby enabling the coincidence gate 25 to provide a "1" signal signifying the end of the sine and cosine function evaluation.

In the numerical example which follows, $R=2$ and two's complement arithmetic is used to illustrate the basic procedure. In this example, $i_0=0$ and the number $$(n-1)=6$$

such that the seven angular increments $\alpha_i$ from Table 2 can be used. The argument $\theta=62°$. In decimal form 62° is $0.6889(\pi/2)$ radians; and in binary form 62° is $$.101100(\pi/2)$$

radians.

From Equation 15 for $n=7$ $$C_0=\frac{1}{\prod_{i=0}^{6}\sqrt{1+2^{-2i}}}=0.60728$$

converting to binary form, $C_0=.100111$.

Tables 3 and 4 show the numerical values in the X, Z and Q registers at each iterative cycle for the first part division-like operation and for the second part multiplication-like operation, respectively. In these tables, the arrows indicate a shift of one bit position in the direction of the arrow; and the underlined bit of the Q number represents in Table 3 and Table 4 the least significant bit which is loaded in the division-like operation (blocks 30–4$a$ and 30–4$b$ in FIG. 7) and tested in the multiplication-like operation (block 40–3 in FIG. 8).

TABLE 3

$Z_{i+1}=2(Z_i \pm X_i)$  $X_i=2^i$ arc tan $2^{-i}$

| i | Z | X | Q |
|---|---|---|---|
| 0 | 0.101100 | 0.100000 | 0000001 |
| | −0.100000 | | |
| | 0.001100 | | |
| 1 | 0.011000 | 0.100100 | 0000010 |
| | −0.100100 | | 0000011 |
| | 1.110100 | | |
| 2 | 1.101000 | 0.100100 | 0000110 |
| | +0.100100 | | 0000110 |
| | 0.001100 | | |
| 3 | 0.011000 | 0.101000 | 0001100 |
| | −0.101000 | | 0001101 |
| | 1.110000 | | |
| 4 | 1.100000 | 0.100000 | 0011010 |
| | +0.100000 | | 0011010 |
| | 0.000000 | | |
| 5 | 0.000000 | 0.100000 | 0110100 |
| | −0.100000 | | 0110101 |
| | 1.100000 | | |
| 6 | 1.000000 | 0.100000 | 1101010 |
| | +0.100000 | | 1101010 |
| | 1.100000 | | |

In Table 3, the recursive Equation 5 is descriptive of the Z number for each iterative cycle; while the X numbers for each iterative cycle is the constant $K_i$. The initial value of the Z number is the argument of 62° expressed in binary form as a percentage of $\pi/2$ radians. The binary significance of the Q number digits represent the directions of rotation for each iterative cycle. For example, the "1" and "0" digits indicate counterclockwise and clockwise rotational directions, respectively. The arrows in the Z and Q columns represent the left-shifting by one bit position of the Q–AR and Z–AR registers, as described in block 30–7 of FIG. 7. Thus, the Q number at the completion of the $i=6$ iterative cycle represents the incremental directions of rotation of a vector which is initially displaced from the zero or X-axis by an angle $\theta=62°$. In Table 4, the digits of the Q number are utilized as multiplier digits to determine whether the X number is subtracted from or added to the Z number as described in the blocks 40–3, 40–4$a$ and 40–4$b$ in FIG. 8.

TABLE 4

$Z_{i-1}=2^{-1}(Z_i \pm X_i)$  $X_{i-1}=X_i \pm 2^{-2i}Z_i$

| i | Z | X | Q |
|---|---|---|---|
| 6 | 0.000000 | 0.100111 | 1101010 |
| | −0.100111 | +0.000000 | 1101010 |
| | 1.011001 | 0.100111 | |
| 5 | 1.101100 | 0.100111 | 0110101 |
| | +0.100111 | −1.111111 | 0110101 |
| | 0.010011 | 0.101000 | |
| 4 | 0.001001 | 0.101000 | 0011010 |
| | −0.101000 | +0.000000 | 0011010 |
| | 1.100001 | 0.101000 | |
| 3 | 1.110000 | 0.101000 | 0001101 |
| | +0.101000 | −1.111111 | 0001101 |
| | 0.011000 | 0.101001 | |
| 2 | 0.001100 | 0.101001 | 0000110 |
| | −0.101001 | +0.000000 | 0000110 |
| | 1.100011 | 0.101001 | |
| 1 | 1.110001 | 0.101001 | 0000011 |
| | +0.101001 | −1.111100 | 0000011 |
| | 0.011010 | 0.101101 | |
| 0 | 0.001101 | 0.101101 | 0000001 |
| | +0.101101 | −0.001101 | 0000001 |
| | 0.111010 | 0.100000 | |

The recursive Equations 13 and 14 are descriptive of the X and Z numbers for each iterative cycle, as illustrated in the table. The initial value of the Z number is zero; while the initial value of the X number is the $C_0$ scaling constant. The binary significance of the right-most (least significant) bit of the Q number determines whether the X number is added to or subtracted from the Z number. Thus, in the first iterative cycle for $i=6$, the right-most Q bit is "0" whereby the X number is subtracted from the Z number. The M number (not specifically identified in Table 4 by a column) is the factor $2^{-2i}Z^i$ of the recursive equation for $X_{i-1}$. This M number is added to the X number when the X number is subtracted from the Z number and the M number is subtracted from the X number when the X number is added to the Z number. Again, the arrows indicate the right-shifting by one position of the Z and Q registers, as described in block 40–7 in FIG. 8.

At the completion of the iteration, i.e., $i=i_0=0$, the numbers in the Z and X registers are the sine and cosine, respectively, of 62°. Table 5 lists the generated values for the sine and cosine of 62° and the values from the trigonometric function table.

TABLE 5

| | Generated value | Table value |
|---|---|---|
| Sine 62° | 0.111010 | 0.111001 |
| Cosine 62° | 0.100000 | 0.011110 |

Hyperbolic functions

Hyperbolic function generation is obtained in a manner similar to trigonometric function generation. For the hyperbolic functions, however, the constant $K_{hi}$ are the hyperbolic angles $$K_{hi}=2^i\alpha_i=2^i(\tanh^{-1}R^{-i}) \quad (16)$$

A better insight into the analogy between rotation in trigonometric and hyperbolic space is obtained from a graphical representation of hyperbolic functions as shown in FIG. 9. In FIG. 9 the hyperbolic equation $x^2-y^2=1$ so that the abscissa X is unity or one when the ordinate $y$ is zero. For any argument $\gamma$, a vector $C_{hn}$ extends from the origin and intersects the $x^2-y^2=1$ hyperbola at a displacement of $\gamma$ from X-axis. The hyperbolic sine (sinh) and the hyperbolic cosine (cosh) of $\gamma$ are represented by the ordinate $Y_{hn}$ and the abscissa $X_{hn}$, respectively. The hyperbolic tangent (tanh) of $\gamma$ is represented by the ordinate $Y_h$ for the abscissa $X=1$; while the hyperbolic cotangent (coth) is represented by the abscissa $X_h$ for the ordinate $Y=1$.

Proceeding in a manner similar to the trigonometric functions (FIGS. 1 and 2) the vector $C_{hn}$ is rotated through the angular increments $\alpha_i$ (from Equation 16). Using hyperbolic identities, the following relationships are obtained:

$$X_{hi}=C_{hi}\cosh\gamma_i \quad (17)$$

$$Y_{hi}=C_{hi}\sinh\gamma_i \quad (18)$$

The identities $$\sinh(\gamma_i\pm\alpha_i)=\sinh\gamma_i\cosh\alpha_i\pm\cosh\gamma_i\sinh\alpha_i \quad (19)$$

$$\cosh(\gamma_i\pm\alpha_i)=\cosh\gamma_i\cosh\alpha_i\pm\sinh\gamma_i\sinh\alpha_i \quad (20)$$

will also be employed.

Again assume that the vector $C_{hi}$ is rotated by an increment $\pm\alpha_i$ (Equation 16) whereby the following relation is obtained:

$$\tanh\alpha_i=\frac{\sinh\alpha_i}{\cosh\alpha_i}=R^{-i} \quad (21)$$

since $$\cosh^2\alpha_i-\sinh^2\alpha_i=1 \quad (22)$$

solution of Equation 22 using Equation 21 gives $$\cosh\alpha_i=\frac{1}{(1-R^{-2i})^{1/2}} \quad (23)$$

and $$\sinh\alpha_i=\frac{R^{-i}}{(1-R^{-2i})^{1/2}} \quad (24)$$

The recursive equations for hyperbolic rotations are $$X_{hi+1}=C_{hi+1}\cosh(\gamma_i\pm\alpha_i) \quad (25)$$

$$Y_{hi+1}=C_{hi+1}\sinh(\gamma_i\pm\alpha_i) \quad (26)$$

and again, using right-triangle relationships, $$C_{hi+1}=(1-R^{-2i})^{1/2}C_{hi} \quad (27)$$

Now, substitute Equations 20, 23, 24, and 27 into Equation 25

$$X_{hi+1}=X_{hi}\pm R^{-i}Y_{hi} \quad (28)$$

In a similar fashion, Equations 19, 23, 24, and 27 substituted in Equation 26 yield $$Y_{hi+1}=Y_{hi}\pm R^{-i}X_{hi} \quad (29)$$

Equations 28 and 29 are the hyperbolic recursion equations for an increasing index, $i=1$ to $(n-1)$. Alternatively, $$X_{hi-1}=X_{hi}\pm R^{-i}Y_{hi} \quad (30)$$

$$Y_{hi-1}=Y_{hi}\pm R^{-i}X_{hi} \quad (31)$$

are the recursive equations for a decreasing index. Like in the sine-cosine evaluation, the vector changes magnitude after each rotation (Equation 27). Therefore, to obtain a unit vector after $n=(m-1)$ rotations, the initial value of the vector is:

$$C_{ho}{}^{(n-1)}=\frac{1}{\prod_{i=1}^{n-1}(1-R^{-2i})^{1/2}} \quad (32)$$

Similar to the trigonometric function evaluation and using a Radix R=2, it is convenient to let $$Z_{hi}=2^iY_{hi} \quad (33)$$

in Equations 30 and 31 yielding $$Z_{hi-1}=2^{-1}(Z_{hi}\pm X_{hi}) \quad (34)$$

$$X_{hi-1}=X_{hi}\pm 2^{-2i}Z_{hi} \quad (35)$$

Thus, using a different set of constants and a slightly modified recursion routine, hyperbolic sine and cosine are obtained in the same arithmetic registers as the trigonometric functions sine and cosine. The exponential function $e^\lambda$ is obtained by generating sinh $\lambda$ and cosh $\lambda$ and summing the two, i.e., $$\sinh\lambda=\frac{e^\lambda-e^{-\lambda}}{2} \quad (36)$$

$$\cosh\lambda=\frac{e^\lambda+e^{-\lambda}}{2} \quad (37)$$

$$\sinh\lambda+\cosh\lambda=\frac{e^\lambda-e^{-\lambda}}{2}+\frac{e^\lambda+e^{-\lambda}}{2}=e^\lambda \quad (38)$$

APPENDIX

The following FORTRAN program was written to illustrate the computation of the trigonometric sine and cosine in accordance with the invention:

```
   DIMENSION Q(7), ALPHA (7)
   DO 10 I=1.7
10 ALPHA (I)=ATANF (1./2** (I-1))
   READ 11, THETA
11 FORMAT (F10.5)
   DO 20 I=1, 7
   IF (THETA) 21, 21, 22
21 THETA=THETA+ALPHA (I)
   Q(I)=0.
   GO TO 20
22 THETA=THETA-ALPHA (I)
   Q(I)=1.
20 CONTINUE
   X=1.
   DO 30 I=1, 7
   FI=I-1
30 X=X/SQRTF (1.+1./2.** (2.*FI))
   Y=0.
   DO 40 I=1, 7
   SY=Y
   Z=1./2** (I-1)
   IF (Q(I)) 41, 41, 42
41 Y=Y-Z*X
   X=X+Z*SY
   GO TO 40
42 Y=Y+Z*X
   X=X-Z*SY
40 CONTINUE
   END
```

At the end of this program, the values of Y and X stored in the memory will equal the sine and cosine functions, respectively, of the argument $\theta$.

What is claimed is:

1. A machine implemented process for determining hyperbolic and trigonometric sine and cosine functions of an argument comprising the steps of:

performing a division-like iterative operation on the argument to derive a quotient that represents the argument to $n$ significant places as a sequence of $n$ angular increments of progressively different constant magnitudes and variable signs;

calculating an initial vector magnitude different from unity based on the number of significant digits; and performing a multiplication-like iterative operation using the digits of the quotient to rotate the initial vector stepwise in directions determined by the said quotient digits whereby the abscissa of the final vector is equal to the cosine function of the argument and the ordinate of the final vector is equal to the sine function of the argument.

2. The process as claimed in claim 1 including the further step of:

dividing the value of the sine function by the value of the cosine function to derive the value of the tangent function of the argument.

3. The process as claimed in claim 1 including the further step of:

adding the values of the hyperbolic sine and cosine functions to derive the exponential function of the argument.

4. The process as claimed in claim 1 including the further step of:

subtracting the value of the hyperbolic cosine function from the value of the hyperbolic sine function to derive the inverse exponential function of the argument.

5. The invention as claimed in claim 1 wherein the initial vector magnitude has a value of $$\prod_{i=i_0}^{n-1} (1+R^{-2i})^{-1/2}$$

where R is the radix and $n$ is the number of significant digits.

References Cited

UNITED STATES PATENTS 3,133,190 5/1964 Eckert ----------- 340—172.5

OTHER REFERENCES

Meggitt, J. E., Pseudo Division and Pseudo Multiplication Processes, IBM Journal, April 1962, pp. 210–226.

PAUL J. HENON, Primary Examiner

R. F. CHAPURAN, Assistant Examiner

U.S. Cl. X.R.

235—197